United States Patent [19]

Ebert et al.

[11] Patent Number: 4,919,514

[45] Date of Patent: Apr. 24, 1990

[54] OPTICAL FIBRES BASED ON POLYCARBONATE FIBRES, AND A PROCESS FOR THE PRODUCTION THEREOF

[75] Inventors: Wolfgang Ebert, Krefeld; Wilfried Haese, Monchen-Gladbach; Roland Vogelsgesang, Leverkusen; Rolf Dhein, Krefeld, all of Fed. Rep. of Germany

[73] Assignee: Bayer Aktiengesellschaft, Leverkusen, Fed. Rep. of Germany

[21] Appl. No.: 294,079

[22] Filed: Jan. 5, 1989

[30] Foreign Application Priority Data

Jan. 21, 1988 [DE] Fed. Rep. of Germany ....... 3801576

[51] Int. Cl.[5] .............................................. G02B 1/04
[52] U.S. Cl. .................................. 350/96.34; 427/163
[58] Field of Search ........................ 350/96.30–96.34; 427/163

[56] References Cited

U.S. PATENT DOCUMENTS 4,733,942  3/1958  Hida et al. .......................... 350/96.34
4,741,597  5/1988  Broer .................................. 350/96.34

Primary Examiner—John D. Lee
Attorney, Agent, or Firm—Sprung Horn Kramer & Woods

[57] ABSTRACT

A process for the production of optical fibers based on aromatic polycarbonates wherein the polycarbonate fibres are coated with a plastic, the improvement which comprises (a) to coat the fiber with an UV irradiation-polymerizable mixture which comprises (A) 25 to 75% by weight, based on the total weight of the polymerizable compounds, of a polyfunctional (meth)acrylic acid derivative of the formula

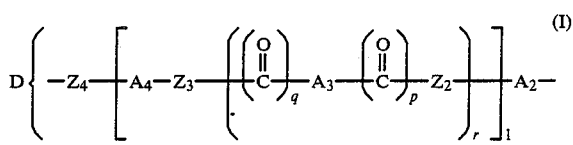

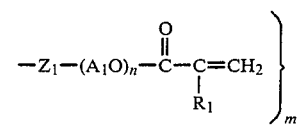

(B) 75 to 25% by weight, based on the total weight of the polymerizable compounds, of a monofunctional (meth)acrylate of the formula

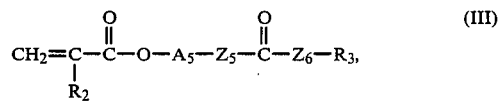

(C) 0.1 to 10% by weight, based on the total weight of the polymerizable compounds, of a photoinitiator, and (b) to polymerize this mixture on the fibre by UV irradiation.

10 Claims, No Drawings

OPTICAL FIBRES BASED ON POLYCARBONATE FIBRES, AND A PROCESS FOR THE PRODUCTION THEREOF

The invention relates to new optical fibres based on plastic-coated aromatic polycarbonate fibres, and to a process for the production of these optical fibres.

Optical fibres based on plastic-coated polyester fibres, for example polycarbonate fibres, are known (see, for example, (a) EP-A-0,203,327 and the published Japanese Applications (b) JA-A-84/216,104; (c) 84/216,105; (d) 84/218,404; (e) 86/231,510; (f) 86/240,206; (g) 86/245,110; (h) 86/278,807). These publications describe optical fibres based on polycarbonate fibres whose polycarbonate core is coated with certain fluorine-containing polymers (see (a), (e), (f), (h)), with certain copolymers of methyl methacrylates, styrene or vinyltoluene and maleic anhydride (see (b)), with certain copolymers of methyl methacrylates, α-methylstyrene and maleic anhydride (see (c)), with certain copolymers of methyl methacrylate, α-methylstyrene, styrene and maleic anhydride (see (d)) and with silicone resins, siliconeacrylate resins, urethane-acrylate resins, polyamides or poly-4-methyl-1-pentene (see (g)).

However, these plastics which have hitherto been proposed for coating aromatic polycarbonate fibres are not satisfactory since they have inadequate heat distortion resistance ((b), (c) and (d)), excessively low elongation at break ((b), (c), (d) and (g)) and/or inadequate adhesion to the polycarbonate ((a), (e), (f), (g) and (h)), are too expensive for use on an industrial scale ((a), (e), (f) and (h)) and/or result in stress cracking in the polycarbonate core (g).

The object was therefore to find coating materials for aromatic polycarbonate fibres which are to be used as optical fibres and do not have the abovementioned disadvantages, but instead not only do not impair, but even reinforce the advantageous properties of polycarbonate fibres (transparency, high refractive index, high heat distortion resistance, good mechanical properties, for example high flexural strength and tear resistance, furthermore low water absorption capacity), which distinguish polycarbonate fibres compared with other plastic fibres used as optical fibres.

It has been found that a coating of optical fibres based on aromatic polyesters, in particular based on aromatic polycarbonates, which has both the optical properties necessary and the thermal and mechanical properties desired, has a high curing rate and, in addition, does not result in stress cracking in the polycarbonate fibre is obtained when the polycarbonate fibres are coated with an UV irradiation-polymerisable mixture which contains polyfunctional (meth)acrylic acid derivatives of a specific type, monofunctional (meth)acrylates of a specific type and customary photoinitiators, and this mixture is polymerised on the fibre by UV irradiation.

The invention therefore relates to a process for the production of optical fibres based on aromatic polycarbonates by coating the polycarbonate fibres with plastics, which is characterized in that UV irradiation-polymerisable mixtures which contain (A) 25 to 75% by weight, based on the total weight of the polymerisable compounds, of polyfunctional (meth)acrylic acid derivatives of the formula

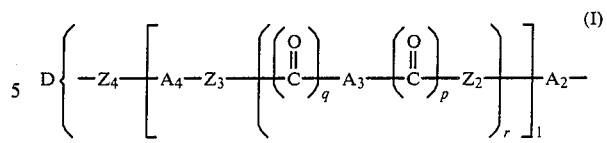

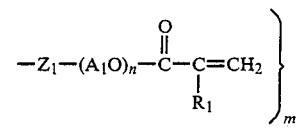

in which
m stands for 2, 3 or 4,
D denotes the m-valent radical of an aliphatic or aromatic hydrocarbon,
$R_1$ is hydrogen or methyl,
$Z_1$, $Z_2$ and $Z_3$, independently of one another, stand for oxygen, sulphur, the —N(R)— group (in which R is hydrogen or optionally substituted alkyl, aralkyl or aryl) or a divalent radical of the formula

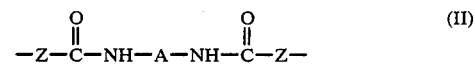

in which
Z denotes oxygen, sulphur or the —N(R)— group, and
A is an optionally substituted divalent radical of an aliphatic, cycloaliphatic, araliphatic or aromatic hydrocarbon,
$Z_4$ stands for oxygen, the divalent radical of the formula (II) or one of the following divalent radicals

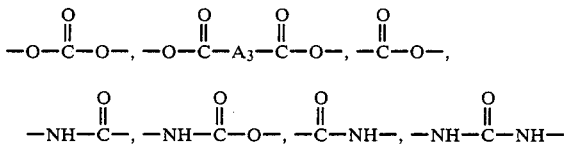

$A_1$, $A_2$, $A_3$ and $A_4$, independently of one another, denote an optionally substituted divalent radical of an aliphatic, cycloaliphatic, araliphatic or aromatic hydrocarbon,
n stands for zero or an integer from 1 to 20,
p, q and r, independently of one another, may adopt the value zero or 1, and
l has a numerical value such that the molecular weight of the polyfunctional (meth)acrylic acid derivative of the formula (I) is 450 to 5000, (B) 75 to 25% by weight, based on the total weight of the polymerisable compounds, of monofunctional (meth)acrylates of the formula

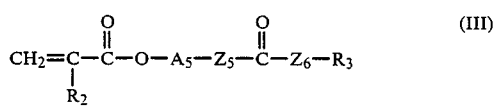

in which
$R_2$ is hydrogen or methyl,
$A_5$ denotes an optionally substituted divalent radical of an aliphatic or cycloaliphatic hydrocarbon, $Z_5$ and $Z_6$, independently of one another, stand for oxygen, sulphur or the —N(R')— groups in which R' is H or optionally substituted alkyl, aralkyl or aryl, and $R_3$ is an optionally substituted alkyl, cycloalkyl or aralkyl radical, and (C) 0.1 to 10% by weight, based on the total weight of the polymerisable compounds, of photoinitiators, are used for the coating, and the mixtures are polymerised on the fibres by UV irradiation.

The invention furthermore relates to the optical fibres obtained by the process according to the invention and comprising a polycarbonate core which is coated with a plastic layer produced by applying the UV irradiation-polymerisable mixture of the abovementioned components A, B and C and subsequently polymerising the mixture on the fibres.

It is known to employ UV irradiation-polymerisable mixtures of polyfunctional and monofunctional (meth)acrylates for coating glass fibres to be used as optical fibres (see, for example, ($\alpha$) EP-A 0,125,710; ($\beta$) EP-A 0,145,929; ($\gamma$) EP-A 0,167,199; ($\delta$) DE-OS (German Published Specification) 3,522,980).

These previously described mixtures developed for coating of glass fibres are unsuitable for aromatic polycarbonate fibres since they result in stress cracking in the polycarbonate core and, in addition, have an excessively high refractive index.

In the process according to the invention, polyfunctional (meth)acrylates of the formula (I) in which m, D, $R_1$, $Z_1$, $Z_2$, $Z_3$, $Z_4$, n, p, q, r and l have the meaning indicated under formula (I) and $A_1$, $A_2$, $A_3$, $A_4$ and A, in dependently of one another, stand for an optionally substituted, divalent aliphatic or cycloaliphatic hydrocarbon radical are preferably employed.

Polyfunctional (meth)acrylates of the formula (I) in which D, L, m, n and r have the meaning indicated under formula (I), p and q have the value 1,
$Z_2$ and $Z_3$ denote oxygen,
$Z_1$ stands for oxygen or the

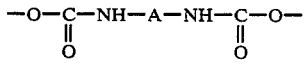

group in which A is an optionally substituted, divalent radical of an aliphatic or cycloaliphatic $C_2$–$C_{18}$-hydrocarbon, preferably the

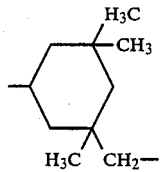

radical, $Z_4$ stands for oxygen or one of the groups

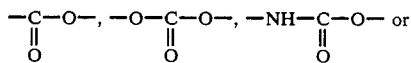

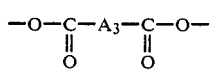

in which $A_3$ is an optionally substituted $C_2$–$C_{18}$-radical of an aliphatic or cycloaliphatic hydrocarbon, $A_1$ is an ethylene or 1,2-propylene radical, and $A_2$, $A_3$ and $A_4$, independently of one another, are optionally substituted, divalent radicals, preferably $C_2$–$C_8$-radicals, of aliphatic or cycloaliphatic hydrocarbons are particularly preferred.

In the process according to the invention, monofunctional (meth)acrylates of the formula (III) in which $R_2$ has the meaning indicated under formula (III), $A_5$ is an optionally substituted $C_2$–$C_6$-alkylene radical, $Z_5$ and $Z_6$, independently of one another, stand for oxygen or the —NH— group and $R_3$ is a $C_1$–$C_{18}$-alkyl radical, are preferably employed.

Monofunctional (meth)acrylates of the formula (III) in which $R_2$ has the meaning indicated under formula (III) and $R_3$ stands for an optionally substituted $C_1$–$C_5$-alkyl radical, $A_5$ stands for an ethylene radical and $Z_5$ stands for oxygen and $Z_6$ for the —NH— group, are particularly preferred.

Tetravalent radicals of aliphatic or aromatic hydrocarbons which may be mentioned for D are, for example, the hydrocarbon radicals based on tetrahydric aliphatic alcohols, such as pentaerythritol.

Trivalent radicals of aliphatic or aromatic hydrocarbons which may be mentioned for D are, for example, the hydrocarbon radicals based on aliphatic triols, such as glycerol, trimethylolethane, trimethylolpropane or hexanetriol, aromatic tricarboxylic acids, such as benzene-1,2,4-tricarboxylic acid or benzend-1,3,5-tricarboxylic acid, or aromatic triisocyanates, such as 2,4,6-toluylene triisocyanate or 4,4',4''-triphenylmethane triisocyanate.

Optionally substituted divalent radicals of aliphatic, cycloaliphatic, araliphatic or aromatic hydrocarbons which may be mentioned for D, $A_1$, $A_2$, $A_3$, $A_4$ and $A_5$ are, in particular, the hydrocarbon radicals based on aliphatic diols, such as ethylene glycol, 1,2-propanediol, 1,3-propanediol, 2,2-dimethyl-1,3-propanediol, 1,2-butanediol, 1,3-butanediol, 2,3-butanediol, 1,4-butanediol, 1,5-pentanediol, 1,6-and 2,5-hexanediol, diethylene glycol, triethylene glycol, dipropylene glycol, 2,2,4-trimethyl-1,3-pentanediol, 2-methyl-2,4-pentanediol, 2-ethyl-1,3-hexanediol, or cycloaliphatic diols, such as 2,2-dimethyl-4,4-dimethylcyclobutanediol, 1,2-cyclopentanediol, 1,3-cyclopentanediol, 1,2-, 1,3-and 1,4-cyclohexanediol, 1,4-bishydroxymethylcyclohexane, 2,2-bis-(4-hydroxycyclohexyl)-propane, 1-methyl-2,2-bis-(4-hydroxycyclohexyl)-ethane, 2-methyl-2,4-bis-(4-hydroxycyclohexyl)-pentane and bis-hydroxy-methyl-hexahydro-4,7-methano-indane.

In addition, the hydrocarbon radicals based on aliphatic dicarboxylic acids, such as succinic acid, dimethylmalonic acid, glutaric acid, methylsuccinic acid, adipic acid, dimethylsuccinic acid, pimellic acid, suberic acid, azelaic acid, sebacic acid, decanedicarboxylic acid or dimeric fatty acid, or cycloaliphatic dicarboxylic acids, such as 1,2-, 1,3- or 1,4-cyclohexanedicarboxylic acid, and, aromatic carboxylic acids, such as terephthalic acid, isophthalic acid, phthalic acid, naphthalene-1,2-, 1,4-, -1,5- and -1,8-dicarboxylic acid, 5-methylisophthalic acid, tetrahydrophthalic acid and hexahydroendomethylene-tetrahydrophthalic acid may be mentioned for $A_3$.

Optionally substituted, divalent aliphatic, cycloaliphatic, araliphatic or aromatic hydrocarbon radicals which may be mentioned for A are, in particular, the hydrocarbon radicals based on aliphatic diisocyanates, such as hexamethylene diisocyanate or trimethylhexamethylene 1,6-diisocyanate, cycloaliphatic diisocyanates, such as cyclohexane 1,4-diisocyanate, cyclopentane 1,3-diisocyanate, methylene-bis-(4,4'-cyclohexyl) diisocyanate and 1-isocyanatomethyl-5-isocyanato-1,3,3-trimethylcyclohexane, and aromatic diisocyanates, such as 2,4- and 2,6-toluylene diisocyanate, 3,3'-dimethyl-4,4'-diphenylmethane diisocyanate, 4,4'-diphenylmethane diisocyanate and 4,4'-diphenyl ether diisocyanate.

Optionally substituted alkyl radicals which may be mentioned for $R_3$ are $C_1$–$C_{18}$-alkyl radicals, such as the methyl, ethyl, propyl, n-butyl, sec.-butyl, i-propyl, tert.-butyl, i-butyl, pentyl, i-pentyl, neopentyl, heptyl, n-hexyl, 2-ethylhexyl, nonyl, decyl, cetyl, dodecyl and stearyl radical, and cycloaliphatic radicals which may be mentioned for $R_3$ are cyclopentyl and cyclohexyl radicals which are optionally substituted by methyl groups; suitable araliphatic radicals are above all the benzyl radical and benzyl radicals substituted by methyl and lower alkoxy groups.

The polyfunctional (meth)acrylic acid derivatives of the formula (I) are compounds containing ether, ester, urethane and/or urea groups. They are preferably polyethers and/or polyester polyols which have been reacted with (meth)acrylic acid derivatives.

The monofunctional (meth)acrylates of the formula (III) are (meth)acrylates which additionally contain an ester, urethane and/or urea group.

The mixtures to be used according to the invention may, in addition to components A, B and C, also contain customary additives, such as solvents which are inert towards polycarbonates, furthermore polymerisation inhibitors, antioxidants etc.

Photoinitiators which may be mentioned as examples are: benzoin, benzoin ethers, benzyl ketals, benzophenone, thioxanthone and derivatives thereof, for example benzyl dimethyl ketal and 2-hydroxy-2-methyl-1-phenyl-propan-1-one.

The polycarbonates to be coated according to the invention and to be used as optical fibres are known. These polycarbonates and the customary processes for their preparation are described, for example, in "Chemistry and Physics of Polycarbonates" Polymer Rev. Vol. 9, Interscience Publishers. They can be prepared, if appropriate, with addition of known chain terminators (see EP-A-0,010,602, DE-OS (German Published Specification) 3,143,252), branching agents, such as trisphenols and/or isatin biscresol(phenol) (see German Published Specifications 1,570,533, 1,595,762 and 2,500,092), stabilisers, such as phosphines and/or phosphites (see EP-A-0,143,906, DE-OS (German Published Specification) 2,140,207) and mould release agents (see German Published Specifications 2,507,748, 2,729,485 and 2,064,095). The polycarbonates are worked up in a known manner by precipitation, spray evaporation or extrusion. The relative viscosity of a 0.5% strength solution of the polycarbonate in methylene chloride should be between 1.18 and 1.32 at 25° C.

The viscosity of the UV irradiation-polymerisable mixtures of components A, B and C to be applied according to the invention to the polycarbonate fibres can be varied within broad limits by means of the choice of the molecular weight of components A and B and/or by means of the ratio of components A and B, and can be matched to the proposed spinning rates and spinning temperatures. The mixtures to be used according to the invention preferably have a viscosity of from 500 to 10000 cP at 25° C. The mixtures to be used according to the invention can be processed at temperatures of from 15 to 140° C.

According to the process, it is possible to firstly produce the polycarbonate core of the optical fibre and later provide it with the coating materials to be applied according to the invention. However, it is more advantageous to carry out the coating immediately after production of the polycarbonate fibres. The thickness of the coating to be applied according to the invention to the polycarbonate fibres should be <50 μm.

The optical fibres according to the invention can be processed to form monofilament or multifilament cables by cladding the optical fibres individually or cladding several optical fibres assembled to form a bundle, with further polymer layers, for example by coextrusion.

EXAMPLES 1 to 12

A polycarbonate fibre (diameter: 1.0 mm) was drawn vertically from top to bottom through the centre of a vessel having a nozzle (diameter: 1.2 mm) in its base. The vessel was in each case filled with one of the coating mixtures described below. The annular gap remaining between the filaments and the nozzle effected even coating of the fibres with the pertinent mixture.

A 20 cm long mercury medium-pressure lamp (power: 120 W/cm) whose focal line had been focused on the filament by means of a parabolic mirror in order to obtain the highest possible light efficiency for UV polymerisation of the coating mixtures was located parallel to the filament and below the coating vessel.

After passing around a deflection roller, the coated filament was wound on a large drum which, by means of a motor drive, pulled the filament through the plant, the speed being a constant 5 m/min.

The thickness of the coating applied to the polycarbonate filaments was in all cases 10 to 30 μm.

The resultant polycarbonate fibres provided with a UV-polymerised coating were stored at room temperature for 1 month and subsequently tested for any damage to the polycarbonate core, for example by stress cracks. In Table 1 below, the results obtained with the individual mixtures and the compositions of the mixtures are collated.

TABLE 1

| Mixture No. | Component A Reaction product | (Parts by wt.) | Component B (parts by weight) | Behaviour of the filament coated with the appropriate mixture on bending the filament around a cylindrical rod of diameter 10 mm after storage for 1 month |
|---|---|---|---|---|
| 1 | d | (50) | 1-(N-butyl-carbamoyl)-ethyl acrylate (50) | No damage |
| 2 | e | (40) | 2-(N-butyl-carbamoyl)-ethyl acrylate (60) | " |
| 3 | g | (40) | 2-(N-butyl-carbamoyl)-ethyl | " |

TABLE 1-continued

| Mixture No. | Component A Reaction product | (Parts by wt.) | Component B (parts by weight) | Behaviour of the filament coated with the appropriate mixture on bending the filament around a cylindrical rod of diameter 10 mm after storage for 1 month |
|---|---|---|---|---|
| 4 | b | (60) | acrylate (60) 2-(N-butyl-carbamoyl)-ethyl acrylate (40) | " |
| 5 | a | (60) | 2-(N-sec.-butyl-carbamoyl)-ethyl acrylate (40) | " |
| 6 | c | (50) | 2-(N-butyl-carbamoyl)-ethyl acrylate (50) | " |
| 7 | f | (50) | 2-(N-butyl-carbamoyl)-ethyl acrylate (50) | " |
| 8 | h | (40) | 2-(N-butyl-carbamoyl)-ethyl acrylate (60) | " |
| 9 | d | (50) | Butyl acrylate (50) | Fracture on bending |
| 10 | h | (60) | N-vinylpyrrolidone (50) | Partial fracture even during storage |
| 11 | e | (50) | Tetrahydrofurfuryl acrylate (50) | Partial fracture even during storage |
| 12 | a | (40) | 2-ethylhexyl acrylate (60) | Fracture on bending |

Note:
All the mixtures 1-12 contained 3 parts by weight of the photoinitiator 2-hydroxy-2-methyl-1-phenyl-propane-1 one.
Mixtures 9 to 12 are comparison mixtures of the prior art The maximum curing rate of the individual mixtures was determined on coated films in the simplified manner described below; however, the results obtained on the films cannot simply be applied to fibres.

The mixtures were applied to a polycarbonate sheet using a hand coater (film thickness: 50 μm). The coated polycarbonate sheets were passed through at a certain rate under a UV irradiation apparatus (UV laboratory instrument from Messrs. U. Steinemann AG: 80 W/cm). The belt speed which just still allows through-curing of the particular mixture was determined (=maximum belt speed [m/min]).

| Mixture | Max. curing speed (m/min) |
|---|---|
| 1 | 60 |
| 2 | >60 |
| 3 | >60 |
| 4 | >60 |
| 5 | >60 |
| 6 | >60 |
| 7 | >60 |
| 8 | 60 |
| 9 | 25 |
| 10 | >60 |
| 11 | 50 |
| 12 | 20 |

Examples 9 to 12 (mixtures 9 to 12) are comparison examples (comparison mixtures).

The reaction products a to h used as component A in mixtures 1 to 12 were obtained as follows:

Reaction product a:

500 g of a linear polyether (average molecular weight: ~1000; product of the reaction of 1,2-propanediol and propylene oxide), 167 g of 2-hydroxyethyl acrylate, 0.5 g of Desmorapid SO and 0.3 g of p-methoxyphenol were introduced into a 2-liter flask equipped with stirrer, thermometer and gas-inlet tube. 265 g of isophorone diisocyanate were subsequently added dropwise at 60° to 65° C. and while passing dry air through the flask. The reaction mixture was subsequently stirred at 60° to 65° C. until the NCO number had dropped to below 0.1%.

Reaction product b:

500 g of a linear polyester containing OH groups (average molecular weight: 1000; OH number 112; product of the reaction of adipic acid and neopentyl glycol), 255 g of 2-hydroxyethyl acrylate and 350 g of isophorone diisocyanate were reacted in the manner described for reaction product (a).

Reaction product c:

500 g of linear, hydroxyl group-containing polyester (average molecular weight: 2250; product of the reaction of adipic acid and butanediol), 300 g of 2-hydroxyethyl acrylate and 335 g of isophorone diisocyanate were reacted in the manner described for reaction product (a).

Reaction product d:

500 g of a linear polypropylene glycol (average molecular weight: 2000), 250 g of 2-hydroxyethyl acrylate and 290 g of isophorone diisocyanate were reacted in the manner described for reaction product (a).

Reaction product e:

500 g of a hydroxyl group-containing linear polyester (average molecular weight: 1000; OH number 112; product of the reaction of adipic acid and neopentyl glycol), 40 g of acrylic acid, 2 g of p-toluenesulphonic acid, 0.3 g of p-methoxyphenol, 0.3 g of di-tert.-butyl-hydroquinone and 190 g of toluene were introduced into a 1-liter flask equipped with stirrer, thermometer, gas-inlet tube and water separator, and heated to the reflux temperature while passing air through the flask. When the theoretical amount of water had been eliminated, the toluene was removed by vacuum distillation.

The product obtained was subsequently introduced into a 1-liter flask fitted with stirrer, thermometer and gas-inlet tube, 0.1 g of Desmorapid SO and 0.05 g of di-tert.-butyl-hydroquinone were added, and the mixture was heated to 60° to 65° C. 50 g of isophorone diisocyanate were added dropwise at this temperature while passing dry air through the flask. The reaction mixture was subsequently stirred at 60° to 65° C. until the NCO number had dropped to below 0.1%.

Reaction product f:

500 g of a hydroxyl group-containing linear polyether (average molecular weight: 1000; product of the reaction of 1,2-propanediol with propylene oxide), 40 g of acrylic acid, 2.7 g of p-toluenesulphonic acid, 0.3 g of p-methoxyphenol, 0.3 g of di-tert.-butyl-hydroquinone and 190 g of toluene were reacted in the manner described for reaction product e), and, after the toluene had been removed by distillation, the product was reacted with 50 g of isophorone diisocyanate, again as described for reaction product e).

Reaction product g:

600 g of a linear hydroxyl group-containing polyester (average molecular weight: 2000; product of the reaction of adipic acid with ethylene glycol, diethylene glycol and butanediol), 22.7 g of acrylic acid, 3.1 g of toluenesulphonic acid, 0.3 g of p-methoxyphenol, 0.3 g of di-tert.-butyl-hydroquinone and 220 g of toluene are reacted in the manner described for reaction product e), and, after the toluene has been removed, the product is reacted with 31.6 g of isophorone diisocyanate, again as described for reaction product e).

Reaction product h:

500 g of a hydroxyl group-containing linear polyether (average molecular weight: 1000; product of the reaction of 1,2-propanediol with propylene oxide), 500 g of 2-hydroxyethyl acrylate and 590 g of isophorone diisocyanate are reacted under the conditions described for reaction product a).

What is claimed is:

1. In the process for the production of optical fibres based on aromatic polycarbonates wherein the polycarbonate fibres are coated with a plastic, the improvement which comprises
    (a) to coat the fibre with an UV irradiation-polymerisable mixture which comprises
    (A) 25 to 75% by weight, based on the total weight of the polymerisable compounds, of a polyfunctional (meth)acrylic acid derivative of the formula

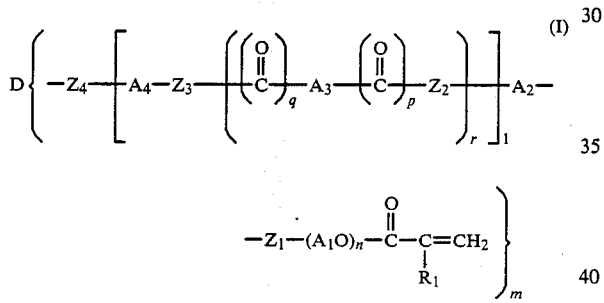

in which m is 2, 3 or 4,

D is the m-valent radical of an aliphatic or aromatic hydrocarbon, $R_1$ is hydrogen or methyl, $Z_1$, $Z_2$ and $Z_3$, independently of one another, are oxygen, sulphur, the —N(R)— group (in which R is hydrogen, alkyl, substituted alkyl, aralkyl, substituted aralkyl, aryl or substituted aryl or a divalent radical of the formula

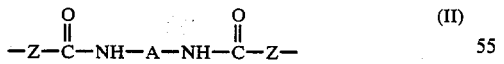

in which

Z is oxygen, sulphur or the —N(R)— group, and

A is a divalent radical of an aliphatic, cycloaliphatic, araliphatic or aromatic hydrocarbon or a substituted divalent radical of an aliphatic, cycloaliphatic, araliphatic or aromatic hydrocarbon, $Z_4$ is oxygen, the divalent radical of the formula (II) or one of the following divalent radicals

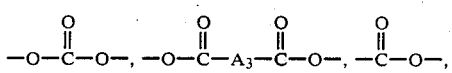

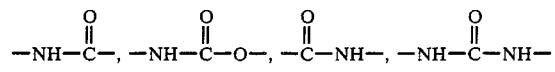

$A_1$, $A_2$, $A_3$ and $A_4$, independently of one another are a divalent radical of an aliphatic, cycloaliphatic, araliphatic or aromatic hydrocarbon or a substituted divalent radical of an aliphatic, cycloaliphatic, araliphatic or aromatic hydrocarbon, n is zero or an integer from 1 to 20.

p, q and r, independently of one another, may adopt the value zero or 1, and l has a numerical value such that the molecular weight of the polyfunctional (meth)acrylic acid derivative of the formula (I) is 450 to 5000, (B) 75 to 25% by weight, based on the total weight of the polymerisable compounds, of a monofunctional (meth)acrylate of the formula

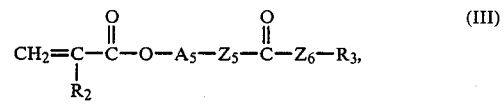

in which $R_2$ is hydrogen or methyl, $A_5$ is a divalent radical or a substituted divalent radical of an aliphatic or cycloaliphatic hydrocarbon, $Z_5$ and $Z_6$, independently of one another, are oxygen, sulphur or the —N(R')— group in which R' is H or alkyl, substituted alkyl, aralkyl, substituted aralkyl, aryl or substituted aryl, and $R_3$ is alkyl, substituted alkyl, cycloalkyl, substituted cycloalkyl, aralkyl or substituted aralkyl, and (C) 0.1 to 10% by weight, based on the total weight of the polymerisable compounds, of a photoinitiator, and (b) to polymerize this mixture on the fibre by UV irradiation.

2. The process of claim 1, wherein in formula (I) of the polyfunctional (meth)acrylate $A_1$, $A_2$, $A_3$, $A_4$ and A, independently of one another are a divalent aliphatic or cycloaliphatic hydrocarbon radical or a substituted divalent aliphatic or cycloaliphatic hydrocarbon radical.

3. The process of claim 1, wherein in formula (I) of the polyfunctional (meth)acrylate p and q each have the value 1, $Z_2$ and $Z_3$ are oxygen, $Z_1$ is oxygen or the

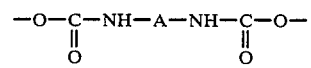

group in which A is a divalent radical of an aliphatic or cycloaliphatic $C_2$–$C_{18}$-hydrocarbon or a substituted divalent radical of an aliphatic or cycloaliphatic $C_2$–$C_{18}$-hydrocarbon, $Z_4$ is oxygen or a group of the formula

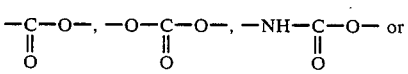

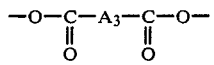

in which $A_3$ is a divalent radical of an aliphatic or cycloaliphatic $C_2-C_{18}$-hydrocarbon or a substituted divalent radical of an aliphatic or cycloaliphatic $C_2-C_{18}$-hydrocarbon, $A_1$ is an ethylene or 1,2-propylene radical, and $A_2$, $A_3$ and $A_4$, independently of one another, are a divalent radical of an aliphatic or cycloaliphatic hydrocarbon or a substituted divalent radical of an aliphatic or cycloaliphatic hydrocarbon.

4. The process of claim 1, wherein in formula (III) of the monofunctional (meth)acrylate, $A_5$ is a $C_2-C_6$-alkylene radical or a substituted $C_2-C_6$-alkylene radical, $Z_5$ and $Z_6$, independently of one another, are oxygen or the —NH—group and $R_3$ is a $C_1-C_{18}$-alkyl radical.

5. The process of claim 1, wherein in formula (III) of the monofunctional (meth)acrylate, $R_3$ is a $C_1-C_5$-alkyl radical or a substituted $C_1-C_5$-alkyl radical, $A_5$ is an ethylene radical and $Z_5$ is oxygen and $Z_6$ the —NH—group.

6. An optical fibre based on an aromatic polycarbonate comprising a polycarbonate fibre coated by an irradiation polymerized mixture of (A) 25 to 75% by weight, based on the total weight of the polymerisable compounds, of a polyfunctional (meth)acrylic acid derivative of the formula

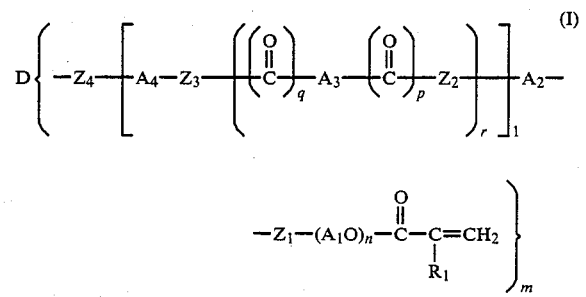

in which m is 2, 3 or 4,

D is the m-valent radical of an aliphatic or aromatic hydrocarbon, $R_1$ is hydrogen or methyl, $Z_1$, $Z_2$ and $Z_3$, independently of one another, are oxygen, sulphur, the —N(R)— group (in which R is hydrogen, alkyl, substituted alkyl, aralkyl, substituted aralkyl, aryl or substituted aryl or a divalent radical of the formula

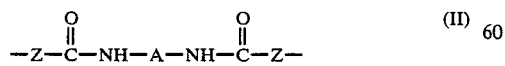

in which

Z is oxygen, sulphur or the —N(R)— group, and

A is a divalent radical of an aliphatic, cycloaliphatic, araliphatic or aromatic hydrocarbon or a substituted divalent radical of an aliphatic, cycloaliphatic, araliphatic or aromatic hydrocarbon, $Z_4$ is oxygen, the divalent radical of the formula (II) or one of the following divalent radicals

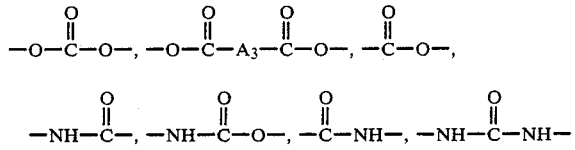

$A_1$, $A_2$, $A_3$ and $A_4$, independently of one another, are a divalent radical of an aliphatic, cycloaliphatic, araliphatic or aromatic hydrocarbon or a substituted divalent radical of an aliphatic, cycloaliphatic, araliphatic or aromatic hydrocarbon, n is zero or an integer from 1 to 20, p, q and r, independently of one another, may adopt the value zero or 1, and l has a numerical value such that the molecular weight of the polyfunctional (meth)acrylic acid derivative of the formula (I) is 450 to 5000, (B) 75 to 25% by weight, based on the total weight of the polymerisable compounds, of a monofunctional (meth)acrylate of the formula

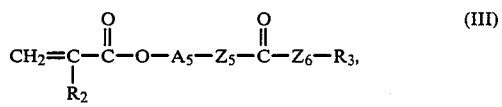

in which $R_2$ is hydrogen or methyl, $A_5$ is a divalent radical or a substituted divalent radical of an aliphatic or cycloaliphatic hydrocarbon, $Z_5$ and $Z_6$, independently of one another, are oxygen, sulphur or the —N(R')—group in which R' is H or alkyl, substituted alkyl, aralkyl, substituted aralkyl, aryl or substituted aryl, and $R_3$ is alkyl, substituted alkyl, cycloalkyl, substituted cycloalkyl, aralkyl or substituted aralkyl, and (C) 0.1 to 10% by weight, based on the total weight of the polymerisable compounds, of a photoinitiator.

7. The optical fibre of claim 6, wherein in formula (I) of the polyfunctional (meth)acrylate $A_1$, $A_2$, $A_3$, $A_4$ and A, independently of one another are a divalent aliphatic or cycloaliphatic hydrocarbon radical or a substituted divalent aliphatic or cycloaliphatic hydrocarbon radical.

8. The optical fibre of claim 6, wherein in formula (I) of the polyfunctional (meth)acrylate p and q each have the value 1, $Z_2$ and $Z_3$ are oxygen, $Z_1$ is oxygen or the

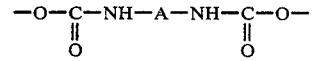

group in which A is a divalent radical of an aliphatic or cycloaliphatic $C_2-C_{18}$-hydrocarbon or a substituted divalent radical of an aliphatic or cycloaliphatic $C_2-C_{18}$-hydrocarbon, $Z_4$ is oxygen or a group of the formula

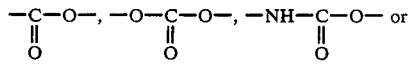

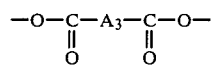

which $A_3$ is a divalent radical of an aliphatic or cycloaliphatic $C_2$–$C_{18}$-hydrocarbon or a substituted divalent radical of an aliphatic or cycloaliphatic $C_2$–$C_{18}$-hydrocarbon, $A_1$ is an ethylene or 1,2-propylene radical, and $A_2$, $A_3$ and $A_4$, independently of one another, are a divalent radical of an aliphatic or cycloaliphatic hydrocarbon or a substituted divalent radical of an aliphatic or cycloaliphatic hydrocarbon.

9. The optical fibre of claim 6, wherein in formula (III) of the monofunctional (meth)acrylate, $A_5$ is a $C_2$–$C_6$-alkylene radical or a substituted $C_2$–$C_6$-alkylene radical, $Z_5$ and $Z_6$, independently of one another, are oxygen or the —NH—group and $R_3$ is a $C_1$–$C_{18}$-alkyl radical.

10. The optical fibre of claim 6, wherein in formula (III) of the monofunctional (meth)acrylate $R_3$ is a $C_1$–$C_5$-alkyl radical or a substituted $C_1$–$C_5$-alkyl radical, $A_5$ is an ethylene radical and $Z_5$ is oxygen and $Z_6$ the —NH—group.

* * * * *